March 25, 1941.    H. W. KOST    2,236,180
METHOD OF SECURING NUTS IN PLATES
Filed Oct. 26, 1938
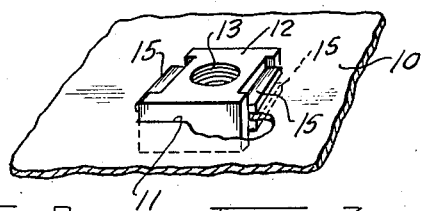
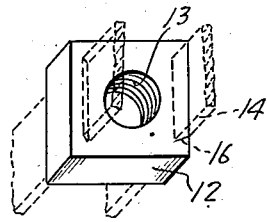
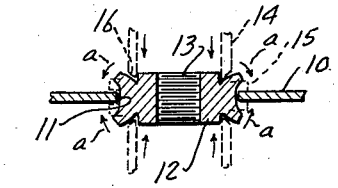
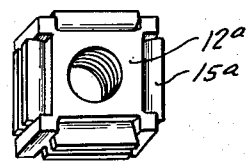
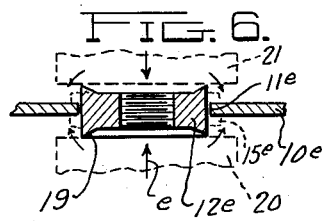
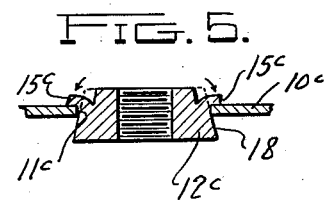
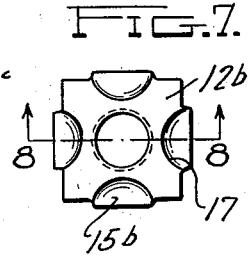
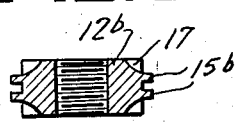
Inventor
Harold W. Kost
By Malcolm W. Fraser
Attorney Patented Mar. 25, 1941

2,236,180

UNITED STATES PATENT OFFICE 2,236,180

METHOD OF SECURING NUTS IN PLATES

Harold W. Kost, Ferndale, Mich., assignor, by mesne assignments, to Detroit Harvester Company, Detroit, Mich., a corporation of Michigan Application October 26, 1938, Serial No. 237,070

2 Claims. (Cl. 29—148)

This invention relates to fastening devices but more particularly to the method of fastening nuts to supporting panels or the like.

An object of the invention is to produce a simple and efficient method by which nuts having relatively plain or uniform size can be readily and conveniently secured in openings in metal plates, portions of the metal of the nut being caused to flow in such manner as to provide rib-like members for securely clinching the nut to the plate.

Illustrative embodiments of the invention are shown by way of illustration but not of limitation on the accompanying drawing in which Figure 1 is a perspective view partly in section of a nut secured to a supporting plate, rib-like flanges being formed on the nut to clinch opposite sides of the supporting plate;

Figure 2 is a perspective view of a conventional nut of polygonal form showing by dotted lines implements employed for forming the rib-like clinching flanges;

Figure 3 is a sectional elevation of a nut and a supporting plate showing the manner in which the implements are employed for causing the metal of the nut to flow in forming the clinching ribs;

Figure 4 is a perspective view of a nut in which the rib-like clinching flanges are formed on each side of a four-sided nut;

Figure 5 is a sectional elevation of a supporting plate and a nut having tapered sides in which one set of rib-like flanges are employed;

Figure 6 is a vertical sectional elevation of another form of nut provided with axially extensions at the side edges for providing the desired clinching flanges to engage the supporting plate;

Figure 7 is a top plan view of a nut formed with rib-like clinching flanges obtained by the use of a curved implement or punching tool; and Figure 8 is a vertical sectional elevation on the line 8—8 of Figure 7.

The illustrated embodiment of the invention comprises a plate or panel 10 having a square opening 11 to receive a four-sided nut 12 as shown in Figure 2. The nut 12 is of conventional form provided with the usual screw-threaded opening 13 disposed centrally thereof. In carrying out the method, the nut 12 is disposed in the opening 11 so that portions thereof extend on opposite sides of the plate 10. By suitably holding the nut 12 and plate 10 in the above position, the metal adjacent the opposite side edges of the nut on both sides of the plate 10 is caused to flow outwardly and inwardly toward the plate 10 in substantially an arcuate path as indicated by the arrows a in Figure 3 to form elongate rib-like clinching flanges 15 which clinch the region of the plate 10 juxtaposed to the aperture 11 thereby securing the nut against axial as well as turning movement. As shown, the rib-like flanges 15 do not extend to the corners of the nut but leave the latter in the original condition thereby to enhance the strength of the nut against turning movements.

The implements or tools for cutting and bracing the metal of the nut to form the rib-like flanges 15 are hardened plate-like instruments having a tapered end portion 16 which, as indicated on Figure 2, inclines upwardly and outwardly with respect to the adjacent side edge of the nut. As shown on Figure 3, the tapered end 16, when suitable pressure is applied to the implement, operates to cam or roll the edge portion of the metal of the nut outwardly and inwardly against the plate as will be readily understood. The forming of the rib-like clinching flanges 15 may be accomplished in a single step whereupon the four flanges are concomittantly formed or if desired, the flanges on one side of the plate 10 may be formed and in a successive step, the flanges on the opposite side of the plate may be formed.

As shown on Figure 4, the nut 12a is formed with pairs of rib-like clinching flanges 15a on each of the four sides, the corner portions being left in their original condition. Obviously, the flanges are formed similarly to the method above described.

In Figures 7 and 8, the nut 12b originally a conventional four-sided nut, is formed with rib-like clinching flanges 15b on each of the four sides but the tool for forming these flanges is differently shaped than the tool 14 and instead of having a straight working end as in the case of the tool 14, the tool has an arcuate working end but with a tapered surface similar to the taper 16, thereby providing a cup-like depression 17. This leaves a greater amount of metal at the corner portions of the nut even when providing longer flanges than shown on Figure 7, inasmuch as the punch curves away from the corner portions of the nut.

According to the construction shown in Figure 5, the nut 12c has a tapered outside surface 18 which, when inserted in the opening 11c of the supporting plate 10c, serves as a stop to limit the axial movement of the nut. The rib-like clinching flanges 15c are formed on the nut on the opposite side of the plate 10c according to the method above described.

A still further method and means is shown in Figure 6 in which the nut 12e is formed with axially extending projections 19 which taper outwardly from the adjacent side of the nut to the side edge thereof. As shown, a similar projection is formed on each of the side edges. The nut is placed in the aperture 11e of the supporting plate 10e so that the plate is substantially midway of the opposite sides of the nut. Plungers 20 and 21 engage opposite sides of the nut 12e and are forced toward each other in the direction of the arrows e. This causes the metal of the projection 19 to flow laterally in a curvilinear path against the opposite sides of the plate 10e to form rib-like clinching flanges 15e, the outer surface thereof being substantially co-extensive with the sides of the nut.

From the above description it will be apparent that I have provided an exceedingly simple and efficient method of securing plain or conventional nuts in supporting plates so that they are rigidly held in place against axial and turning movements. The implements or tools may be of simple and inexpensive construction and the pressing or punching operations carried out by relatively unskilled workmen. One important feature of this invention resides in the rib-like clinching flange which engages a substantial side of the opening in which the nut is disposed thereby effectively holding the nut against axial movement. Difficulty has heretofore been experienced in holding nuts of this character in place particularly where merely the corner portions are upset inasmuch as insufficient surface adjacent the opening is engaged to militate against pulling the nut out when in use.

It is to be understood that although I have described embodiments of the invention in connection with four-sided nuts that other shaped nuts such as hexagonal nuts may be employed.

It is to be understood that numerous changes in details of construction, arrangement and operation may be effected without departing from the spirit of the invention especially as defined in the appended claims.

What I claim is:

1. The method of securing a polygonal nut of uniform exterior in a polygonal aperture of a size and shape sufficient to fit the nut with portions of the nut disposed on opposite sides of the aperture, which consists in inserting the nut into the aperture, and thereafter applying pressure to opposite sides of the nut adjacent the side edges thereof but away from the corners to cause the metal to flow laterally in a substantially arcuate path to form rib-like projections in gripping relation upon opposite side edges of the aperture.

2. That method of the character described which consists in providing a nut having axial projections at the side edge thereof and at opposite ends, inserting the nut into an aperture in a plate, and applying pressure in an axial direction against said projections to cause the metal to flow laterally upon the plate.

HAROLD W. KOST.